(12) United States Patent
Harder (10) Patent No.: US 7,469,949 B2
(45) Date of Patent: Dec. 30, 2008

(54) SLIDABLE ROOM ARRANGEMENT FOR RECREATIONAL TRAILER

(76) Inventor: Reginald B. Harder, Box 189, Gretna, Manitoba (CA) R0G 0V0

( * ) Notice: Subject to any disclaimer, the term of this patent is extended or adjusted under 35 U.S.C. 154(b) by 1143 days.

(21) Appl. No.: 10/788,402

(22) Filed: Mar. 1, 2004

(65) Prior Publication Data

US 2005/0189785 A1  Sep. 1, 2005

(51) Int. Cl.
*B60P 3/34* (2006.01)
(52) U.S. Cl. .................................................. 296/26.13
(58) Field of Classification Search ............. 296/26.13, 296/171, 165, 24.4, 26.01, 26.12, 24.3; 52/67
See application file for complete search history.

(56) References Cited

U.S. PATENT DOCUMENTS

| | | | | |
|---|---|---|---|---|
| 4,049,310 | A | * | 9/1977 | Yoder .......................... 296/176 |
| 4,915,435 | A | | 4/1990 | Levine |
| 5,154,469 | A | | 10/1992 | Morrow |
| 5,890,728 | A | * | 4/1999 | Zilm .......................... 280/433 |
| 6,082,799 | A | * | 7/2000 | Marek ....................... 296/26.12 |
| 6,098,346 | A | * | 8/2000 | Miller et al. .................... 52/67 |
| 6,209,939 | B1 | | 4/2001 | Wacker |
| 6,290,284 | B1 | | 9/2001 | Crean |
| 6,293,612 | B1 | * | 9/2001 | Crean ....................... 296/26.13 |
| 6,302,475 | B1 | | 10/2001 | Anderson |
| 6,428,073 | B1 | | 8/2002 | Blodgett, Jr. |
| 6,447,048 | B2 | * | 9/2002 | Crean ....................... 296/26.13 |
| 6,497,442 | B1 | * | 12/2002 | Wacker .................... 296/26.13 |
| 6,505,873 | B1 | * | 1/2003 | Crean ....................... 296/26.13 |
| 6,637,804 | B1 | * | 10/2003 | Crean ....................... 296/26.13 |
| 7,165,799 | B2 | * | 1/2007 | Crean ......................... 296/37.1 |
| 7,328,927 | B1 | * | 2/2008 | Crean ....................... 296/26.13 |
| 7,347,472 | B2 | * | 3/2008 | Pellegrin, Jr. ............ 296/24.38 |
| 2002/0043812 | A1 | | 4/2002 | Crean |
| 2002/0047291 | A1 | | 4/2002 | Crean |

* cited by examiner

*Primary Examiner*—Kiran B. Patel (57) ABSTRACT

A recreational trailer has a central longitudinal bathroom at one end, with a refrigerator abutting a bathroom crosswall in the fixed central portion, and a kitchen counter at the other end of the fixed central portion. The bathroom has at least one door in one longitudinal wall, usually two opposed doors in its longitudinal walls. Two slideout rooms provide space when expanded for two bedrooms adjacent the bathroom. Doors attached to the longitudinal bathroom walls when closed meet slideout stub wall panels from the slideout room outer longitudinal walls providing bedroom privacy. When two bathroom doors are present, both are lockable to provide access to and privacy in the bathroom, which has shower, toilet and vanity. The slideout rooms extend along the bulk of the trailer and provide space for kitchen and dining room. The advantages are that the weight of bathroom, plumbing and tanks is along the central axis as is the weight of much of the kitchen, which makes road handling easier than when the weight is on one side and off center. The extra width also shortens trailer length reducing cost of material. The trailer can be towed or fifth wheel.

4 Claims, 6 Drawing Sheets

SLIDABLE ROOM ARRANGEMENT FOR RECREATIONAL TRAILER

This application relates to slidable room arrangements for recreational trailers.

This application relates to a recreational trailer, fifth wheel or bumper towed, having paired opposed slidable rooms, preferably substantially identical. The rooms are slidable between expanded positions, when the interior of trailer interior is usable, and retracted positions when the interior is mostly unusable. The rooms extend along all or part of side the trailer and are separated internally when retracted by a longitudinal central space. This space preferably contains a room, more preferably a central bathroom enterable from one side, preferably both sides, when the rooms are expanded. The bathroom preferably has vanity, shower and toilet. The rooms on either side of the bathroom preferably have pull out sofa beds, stub walls and a door. The central space may extend longitudinally of the recreational trailer and typically includes refrigerator, and at least part of a kitchen. Although the invention is described as relating to recreational trailers with opposed expandable-retractable rooms having therebetween a central space when retracted containing a central washroom extending longitudinally, it is not limited thereto. It will be understood by those skilled in the art that the principles of this invention are equally applicable to similar structures for trailers having opposed paired expandable-retractable rooms with a central longitudinal space comprising a central room accessible from one room, preferably both rooms, when expanded. It will be also understood by those skilled in the art that the invention is not limited to such structures paired opposed rooms having an accessible central room when expanded.

PRIOR ART

U.S. Pat. No. 5,154,469 to Morrow issued 13 Oct. 1992 shows a trailer with two pairs of opposed slideout rooms, which when expanded do not communicate. U.S. Pat. No. 6,209,939 to Wacker issued 3 Apr. 2001, shows another trailer with slideout rooms on both sides. U.S. Pat. No. 6,302,475 to Anderson issued 16 Oct. 2001, shows a trailer or vehicle with opposed slideout rooms, which when retracted have a central separating space. U.S. Pat. No. 6,428,073 to Blodgett, Jr. issued 6 Aug. 2002, shows a trailer with slideout rooms on both sides as does U.S. Pat. No. 6,497,442 to Wacker issued 24 Dec. 2002. U.S. Pat. No. 4,915,435 to Levine issued 10 Apr. 1990, shows a trailer with a fixed washroom. U.S. Pat. No. 6,098,346 to Miller et al. issued 8 Aug. 2000, shows a vehicle with a slideout kitchen and fixed side washroom facilities. U.S. Pat. No. 6,290,284 to Crean issued 18 Sep. 2001, shows a vehicle with slideout rooms on one side and fixed washroom and kitchen facilities on the other. U.S. Pat. No. 6,293,612 to Crean issued 25 Sep. 2001, shows a vehicle with slideout rooms on one side and fixed washroom and kitchen facilities on the other. U.S. Application 2002/0,043,812 to Crean published 18 Apr. 2002 shows a vehicle with a slideout room on one side and fixed kitchen facilities on the other. U.S. Application 2002/0,047,291 to Crean published 25 Apr. 2002 shows a vehicle with slideout rooms on one side and fixed washroom and kitchen facilities on the other. These patents and applications are hereby incorporated by reference.

In all camper type units known to applicant such as motor homes, fifth wheel and bumper tow trailers and the like, all cabinets are out on the outside wall. Further all bathrooms in motor homes, fifth wheel and bumper tow trailers and the like, known to applicant are also placed against an outside wall. No version known to applicant is otherwise in twenty-five years' experience in the motor home business.

The idea of a central bathroom does not occur in the prior art. The advantages of providing a central bathroom seem obvious. It can be placed as an isle between paired opposed expandable-retractable rooms. An access door opens into the bathroom from one room, preferably access doors open from both rooms, when two doors are present one or both can be locked for privacy in use. The paired rooms can be equipped and used as separate bedrooms, themselves private. Additionally the refrigerator can be placed against the central bathroom wall, where it is accessible from the kitchen and dining room. As can be easily seen placing either bathroom and refrigerator in any other location(s) makes the unit less usable. This arrangement provides five rooms—bathroom, bedroom, second bedroom, kitchen and dining room. Variations are possible rearranging the bedrooms and dining room, with a central bathroom. Also unlike most other units the plumbing and its accompanying water tanks are centrally placed and not on one or the side. Thus the center of gravity of plumbing and its associated tanks will be in the center of the trailer and coincide with the center of gravity of the rest of the trailer. This weight distribution makes the trailer handle a lot better since its center of gravity is in the center of the trailer, and not on either side. A further advantage is that the trailer can be considerably shorter in length, while providing the same internal area.

It is a principal object of the invention to provide a trailer with living accommodation, having a fixed central portion with substantially identical opposed slideout lateral room portions slidably mounted within the central portion and movable between a first retracted position and a second expanded position, and within the fixed central portion a room extending longitudinally along the fixed central portion, having at least two side walls, one wall having therein a side door permitting access to a slide out room, and at least one crosswall. It is a further principal object that the side walls have therein opposed side doors permitting access to the slideout rooms through them and at least one crosswall. It is a further principal object of the invention that the room is a bathroom. It is a subsidiary object of the invention to provide vanity, shower and toilet in the bathroom. It is a subsidiary object of the invention that the side walls extend from one end of the trailer toward the other end of the trailer. It is a further subsidiary object of the invention to provide a door and a partition between the outer edge of at least one slideout room and the sidewall of the longitudinal room to provide a compartment adjacent the longitudinal room and having access thereto through the side door. It is a further subsidiary object of the invention to provide a door and a partition between the outer edge of both slideout rooms and both sidewalls of the longitudinal room. It is a further subsidiary object of the invention that the compartment or compartments in second expanded position provide sleeping accommodation. It is a further subsidiary object to provide an alcove for a refrigerator abutting the room crosswall in the fixed central portion of the trailer. It is a further subsidiary object of the invention to provide a central closet. It is a further subsidiary object of the invention to provide a kitchen in the fixed central portion abutting the end of the trailer away from the bathroom. It is a further subsidiary object to provide a dining area mounted in the roadside slideout room outside the compartment. It is a further subsidiary object of the invention to provide an external door in the curbside slideout room outside the compartment. It is a further subsidiary object of the invention that the trailer be towed or fifth wheel. Other objects of the invention

DESCRIPTION OF THE INVENTION

In a first broad aspect the invention is directed to a trailer having therein living accommodation, having a fixed central portion and slideout lateral room portions slidably mounted within the central portion and movable between a first retracted position and a second expanded position. These slideout room portions being substantially identical in size and opposed to each other. A room in the fixed central portion extends longitudinally along the fixed central portion, it has two side walls, and at least one crosswall. At least one side wall has therein a side door permitting access to one said slideout room, preferably both side walls have opposed side doors permitting access to the slideout rooms. The crosswall is typically about the middle of the fixed central portion. The slideout rooms when in first retracted position are telescopically nested within the central portion having their inner edge adjacent the room in the fixed central portion and their outer edges adjacent the outer edges of the fixed central portion. The slideout rooms in second expanded position have their inner edges adjacent the outer edges of the fixed central portion. The side walls may extend from one end of the trailer toward the other end of the trailer. More preferably a door and a partition extend between the outer edge of at least one slideout room and the sidewall of the longitudinal room. These provide a compartment adjacent the longitudinal room and having access thereto through the side door. This partition may be a stubwall, fixed in the slideout room, and the door may be a pocket door slidably mounted in the stubwall. The partition may also be a slidable panel mounted between supports fixed in the slideout room and the door is hingeably mounted on the sidewall. Preferably there is a door and a partition, which extend between the outer edge of each slideout room and the side walls of the longitudinal room providing compartments adjacent the longitudinal room and having access thereto through the side doors. Again both partitions may be stubwalls, fixed in each slideout room, and each door is a pocket door slidably mounted in each stubwall. Both partitions may be slidable panels mounted between supports fixed in each slideout room and the doors are hingeably mounted on the sidewalls. A second crosswall in combination with the first crosswall and access doors in the longitudinal walls may provide a central closet. The vehicle may be a towed or fifth wheel trailer.

In a further broad aspect the invention is directed to a trailer having therein living accommodation, having a fixed central portion and slideout lateral room portions slidably mounted within the central portion and movable between a first retracted position and a second expanded position. These slideout room portions being substantially identical in size and opposed to each other. A bathroom in the fixed central portion extends longitudinally along the fixed central portion, it has at least two side walls, at least one side wall having therein a side door permitting access to one said slideout room, more preferably opposed side doors permitting access to both slideout rooms, and at least one crosswall. The crosswall is typically about the middle of the fixed central portion. A second crosswall in combination with access doors in the longitudinal walls and the first crosswall may provide a central closet. The slideout rooms when in first retracted position are telescopically nested within the central portion having their inner edge adjacent the bathroom and their outer edges adjacent the outer edges of the fixed central portion. The slideout rooms in second expanded position have their inner edges adjacent the outer edges of the fixed central portion. Preferably the side walls extend from one end of the trailer toward the other end of the trailer. More preferably wherein a door and a partition extend between the outer edge of at least one slideout room and the sidewall of the longitudinal bathroom. These provide a compartment adjacent the longitudinal bathroom and having access thereto through the side door. This partition may be a stubwall, fixed in the slideout room, and the door may be a pocket door slidably mounted in the stubwall. The partition may also be a slidable panel mounted between supports fixed in the slideout room and the door is hingeably mounted on the sidewall. Preferably there is a door and a partition, which extend between the outer edge of each slideout room and the side walls sidewall of the longitudinal bathroom providing compartments adjacent the longitudinal bathroom and having access thereto through the side doors. Again both partitions may be stubwalls, fixed in each slideout room, and each door is a pocket door slidably mounted in each stubwall. Both partitions may be slidable panels mounted between supports fixed in each slideout room and the doors are hingeably mounted on the sidewalls. Preferably the compartment in second expanded position provides sleeping accommodation. This accommodation typically includes a sofa/pullout bed or bunks, together with overhead cabinets in the slideout room. Nearly always the bathroom comprises shower, toilet and vanity. Typically the access doors enter into the shower area between vanity and toilet. The trailer may be towed or fifth wheel.

The invention in another broad aspect is directed to a trailer having therein living accommodation, having a fixed central portion and slideout lateral room portions slidably mounted within the central portion and movable between a first retracted position and a second expanded position. These slideout room portions being substantially identical in size and opposed to each other. A bathroom in the fixed central portion extends longitudinally along the fixed central portion, it has at least two side walls having therein at least one side door permitting access to a slideout room, preferably opposed side doors permitting access to the slideout rooms through them and at least one crosswall. The crosswall is typically about the middle of the fixed central portion. A second crosswall in combination with access doors in the longitudinal walls and the first crosswall may provide a central closet. The slideout rooms when in first retracted position are telescopically nested within the central portion having their inner edge adjacent the bathroom and their outer edges adjacent the outer edges of the fixed central portion. The slideout rooms in second expanded position have their inner edges adjacent the outer edges of the fixed central portion. The side walls extend from one end of the trailer toward the other end of the trailer. A door and a partition extend between the outer edge of each one slideout room and each sidewall of the longitudinal bathroom. These provide a compartments adjacent the longitudinal bathroom and having access thereto through the side doors. These compartments in second expanded position provide sleeping accommodation. This accommodation typically includes a sofa/pullout bed or bunks, together with overhead cabinets in the slideout room. Preferably the trailer portion apart from the bathroom and the compartments, has a refrigerator in an alcove abutting the crosswall on its side opposite the bathroom. There is a kitchen in the fixed central portion abutting the end of the trailer away from the bathroom. A dining area is mounted in the roadside slideout room outside the compartment, typically fixed table and chairs, Also there is an external door in the curbside slideout room outside the compartment. The trailer may be towed or fifth wheel.

DESCRIPTION OF THE PREFERRED EMBODIMENT

Figure 1:
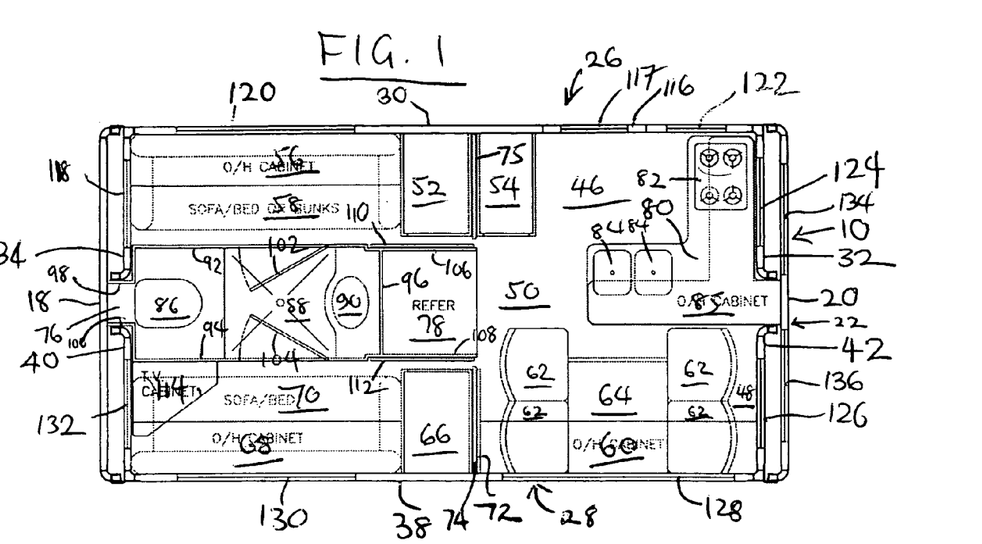
FIG. 1 shows a plan view of a trailer of the invention in retracted mode.
Figure 2:
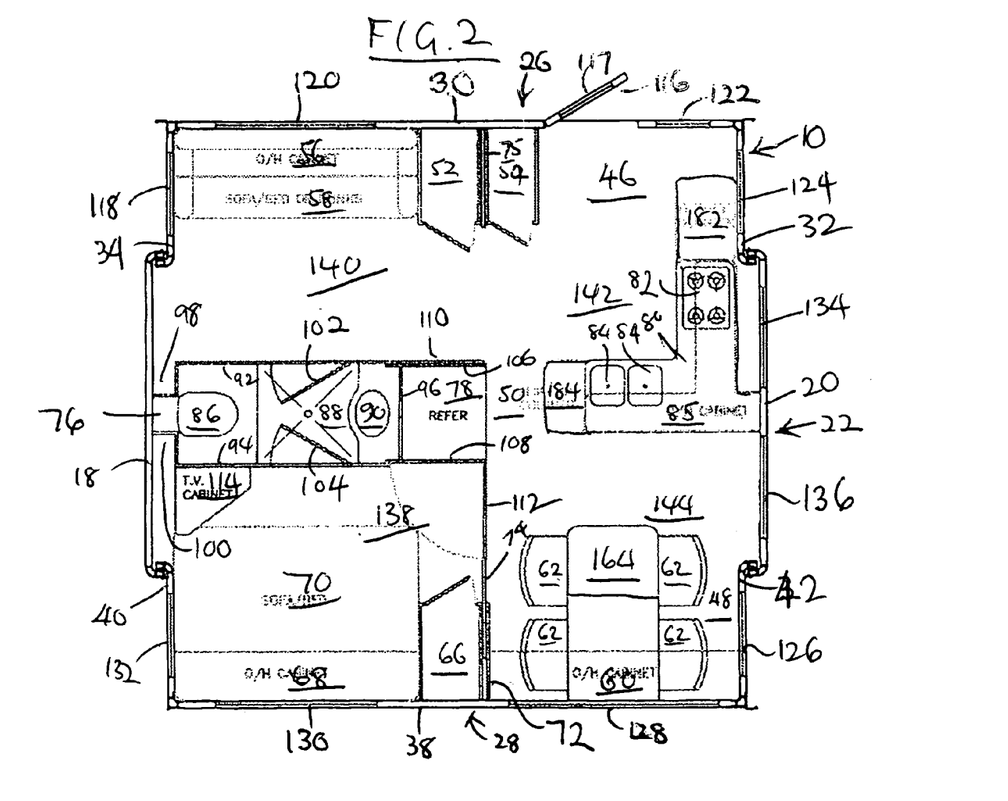
FIG. 2 shows a plan view of the trailer of FIG. 1 in expanded mode.
Figure 3:
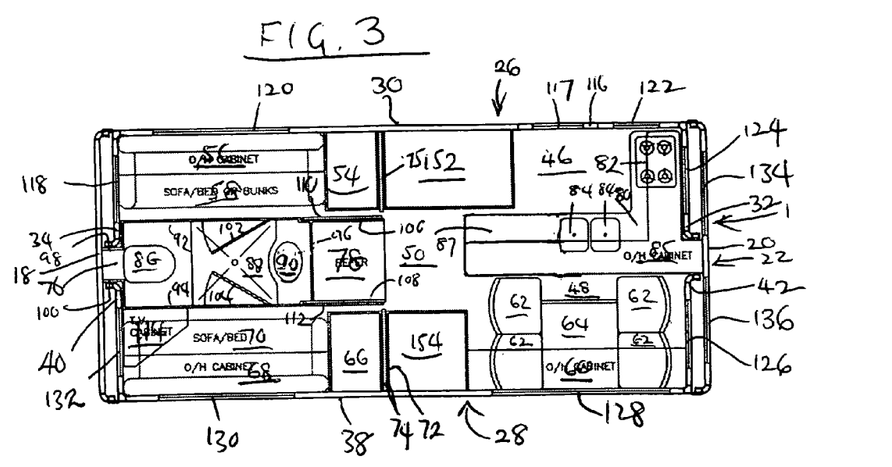
FIG. 3 shows a plan view of another trailer of the invention in contracted mode.
Figure 4:
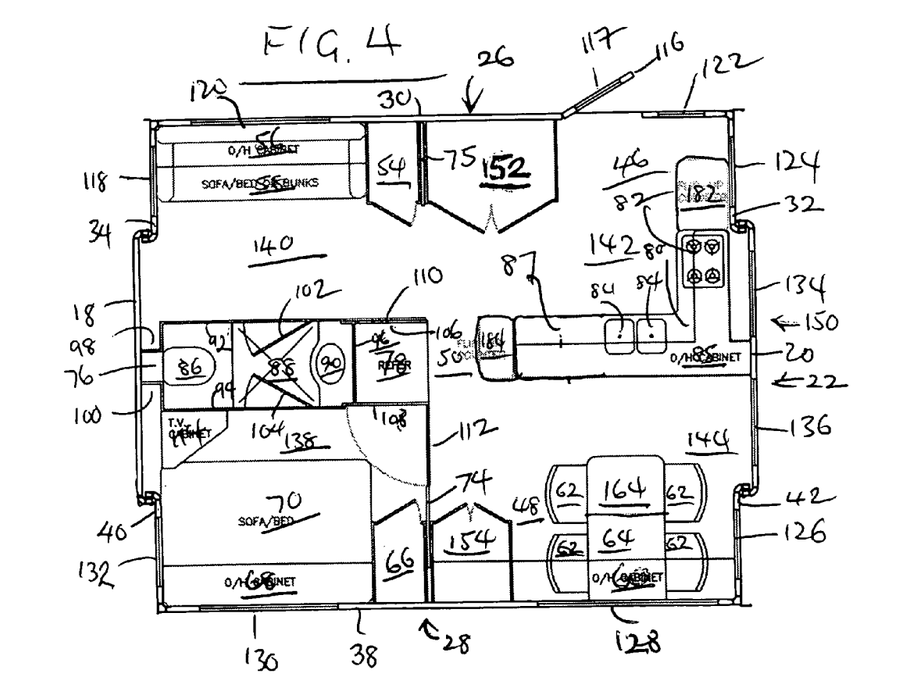
FIG. 4 shows a plan view of the trailer of FIG. 3 in expanded mode.
Figure 5:
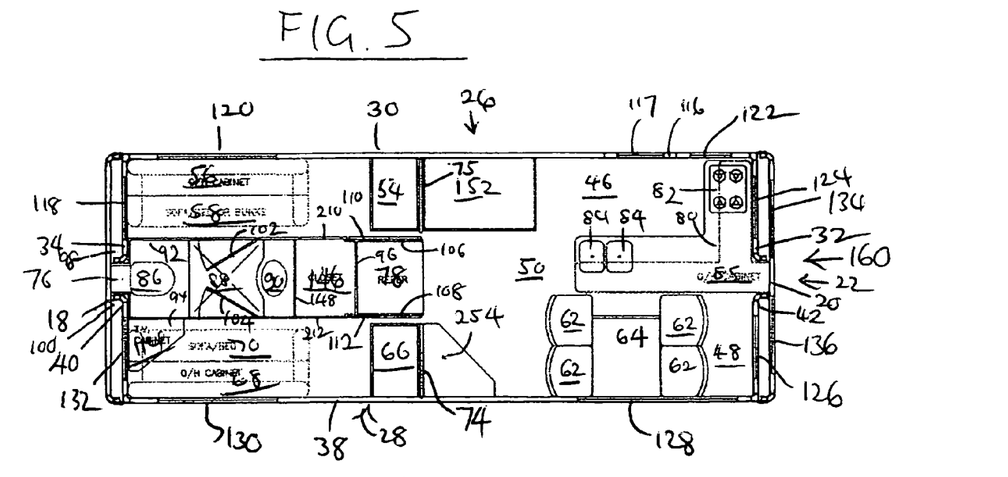
FIG. 5 shows a plan view of a third trailer of the invention in contracted mode.
Figure 6:
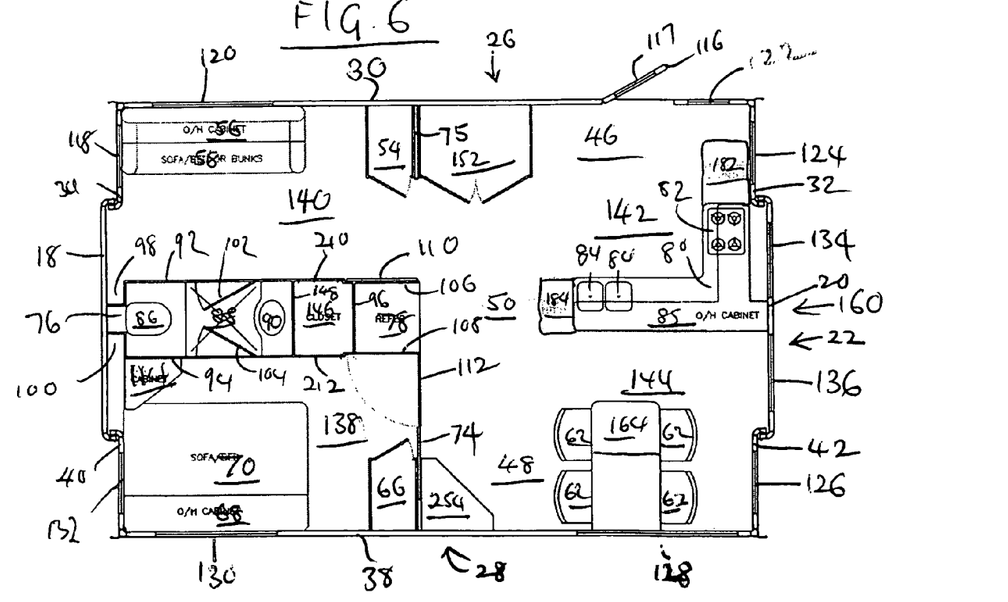
FIG. 6 shows a plan view of the trailer of FIG. 5 in expanded mode.
Figure 7:
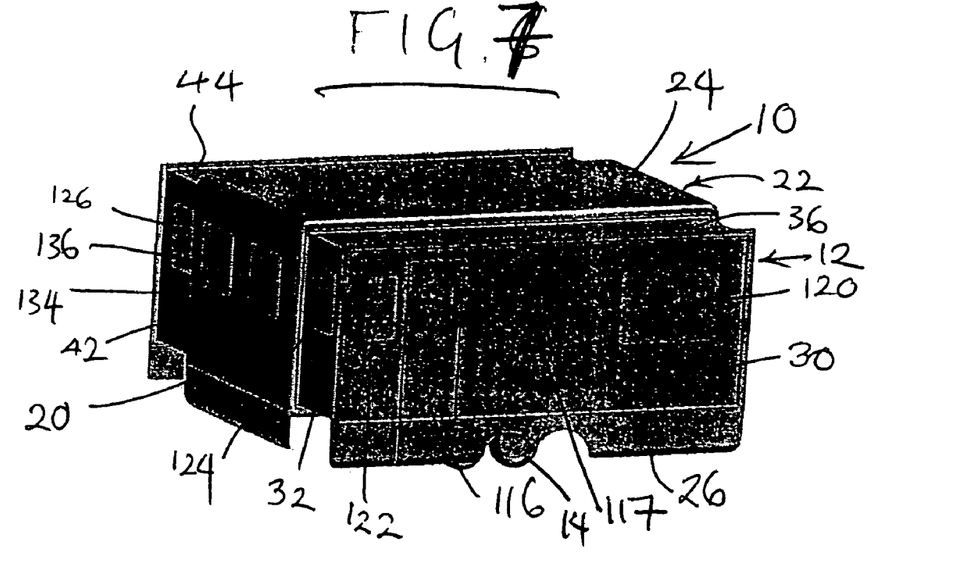
FIG. 7 shows an exterior curbside view of a trailer of the invention in expanded mode.
Figure 8:
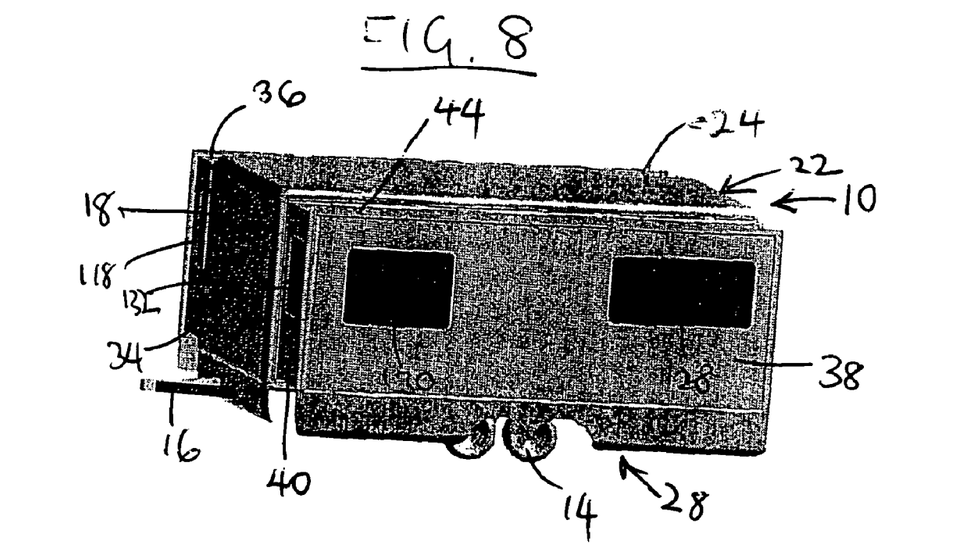
FIG. 8 shows an exterior roadside view of a trailer of the invention in expanded mode.
Figure 9:
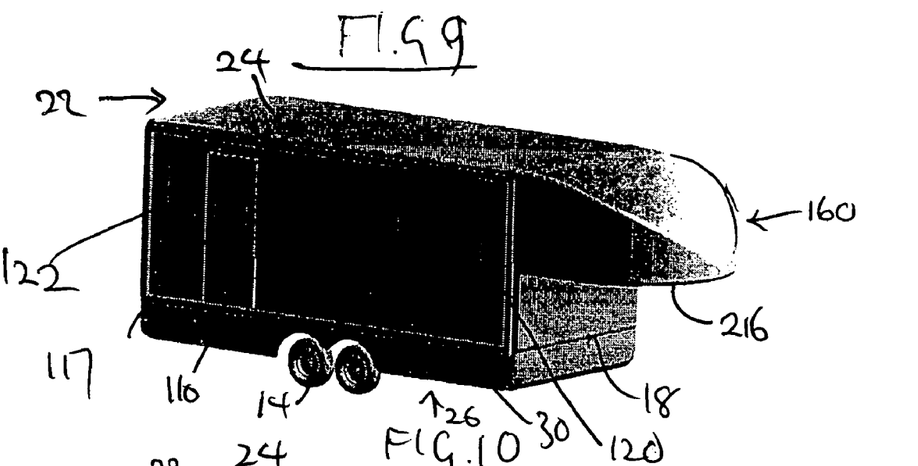
FIG. 9 shows an exterior curbside view of a trailer of the FIGS. 5 and 6 in contracted mode.
Figure 10:
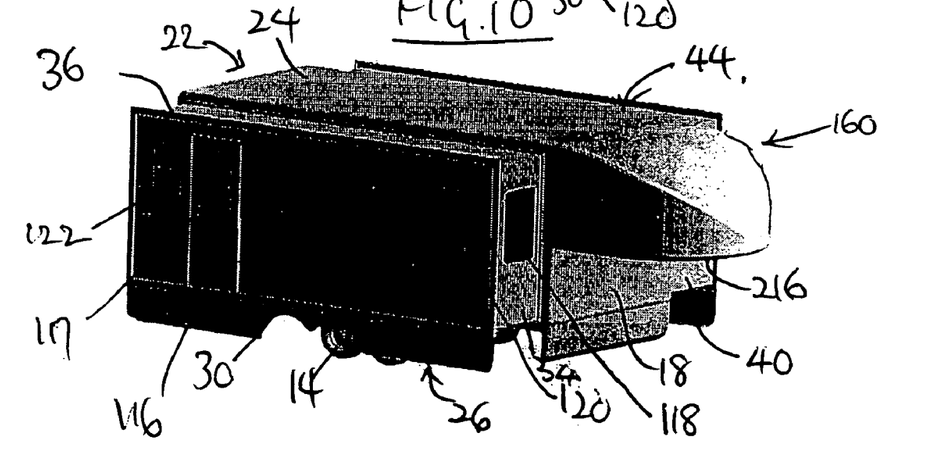
FIG. 10 shows an exterior curbside view of a trailer of the FIGS. 5 and 6 in expanded mode.
Figure 11:
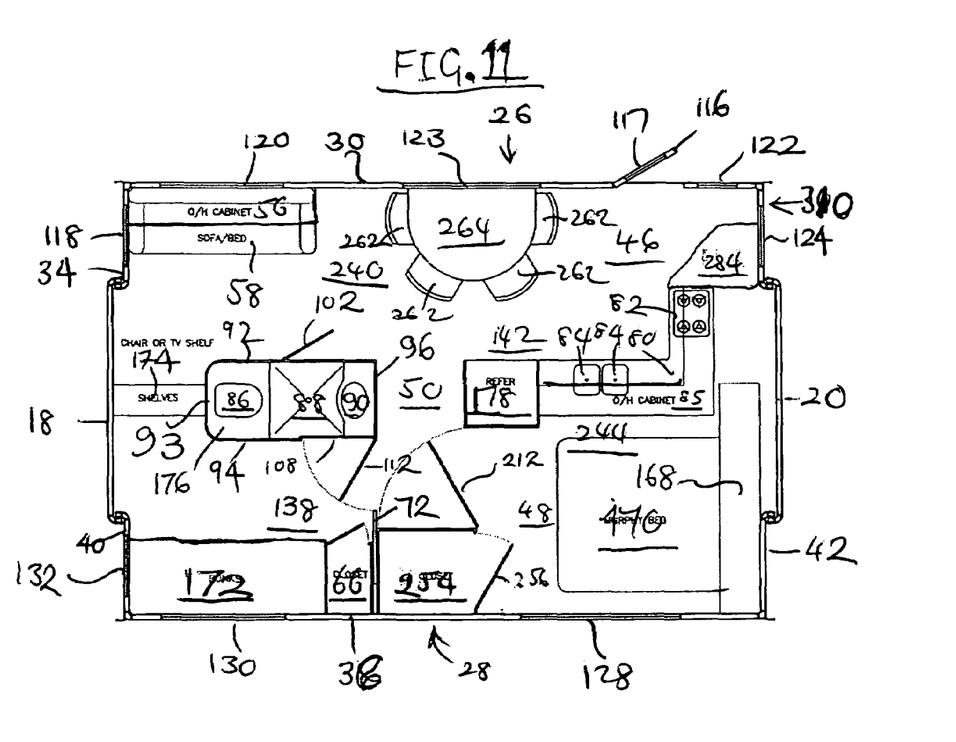
FIG. 11 shows a plan view of a fourth trailer of the invention.

The invention is now illustrated by reference to the preferred embodiments thereof. Numeral 10 indicates the trailer of the invention with generally rectangular body 12, wheels 14 and tow hitch 16 or fifth wheel hitch 216. Body 12 has fixed portion 22, comprising externally visible front wall 18, rear wall 20, and roof 24. It has two slideout rooms 26 and 28 retracted in FIG. 9 and expanded in FIGS. 7, 8 and 10. In FIG. 1 both 26 and 28 are retracted. Curbside slideout room 26 has exterior vertical wall 30, rear lateral wall 32 and front lateral wall 34, it has a roof or top wall 36. Similarly roadside slideout room 28 has exterior vertical wall 38, front lateral wall 40, rear lateral wall 42, and top wall or roof 44. Both slideout rooms have floor 46 (of slideout 26) and 48 (of slideout 28), which may be flush with floor 50 of fixed portion 22, or may be stepped from fixed floor 50. Attached to exterior wall 30 and floor 46 of slideout room 26 are closets or cupboards 52 and 54. Overhead cabinet 56 is mounted on wall 30, while extendible sofa-bed 58 is similarly attached to wall 30. Alternatively as well known to those skilled in the art bunks may replace sofa-bed 58. Similarly exterior wall 38 of slideout room 28 has overhead cabinet 60 attached, seats 62 attached to floor 48, table 64 is attached to floor 48 and wall 38. Closet or cupboard 66 is attached to floor 48 and wall 38. Overhead cabinet 68 is attached to wall 38 as is sofa-bed 70, which again as those skilled in the art know could also be replaced by bunks. Projecting from wall 38 adjacent closet 66 is wall 72, between wall 72 and closet 66 is sliding panel 74, a similar panel 75 slides between closets 52 and 54. Central and mounted on floor 50 of fixed portion 22 is bathroom 76, refrigerator 78 and kitchen counter 80 with associated stove 82 and sinks 84 and overhead cabinet 85. Bathroom 76 as shown has toilet 86, shower 88 and vanity 90, and parallel walls 92 and 94, and crosswall 96. Walls 92 and 94 have recesses 98 and 100 to accommodate the interior ends of walls 34 and 40 respectively in retracted position as shown in FIG. 1. Walls 92 and 94 also have access doors 102 and 104. Refrigerator 78 sits in an alcove formed by wall 96 and walls 106 and 108. Pivotally mounted on alcove walls 106 and 108 are bedroom doors 110 and 112. Alternatively pocket wall bedroom doors may replace panels 74 and 75 and doors 110 and 112. Optionally a TV cabinet or other entertainment center 114 can be mounted on wall 94. Outer door 116 with door window 117 allows access through wall 30, windows 118, 120, 122 and 124 allow light to enter through wall 30. Similar windows 126, 128, 130 and 132 allow light to enter through wall 38. Additionally there are windows 134 and 136 in wall 20 of fixed portion 22. In FIG. 2 the trailer 10 is shown in expanded mode, as can be seen bedrooms 138 and 140, kitchen 142 and dining room 144 are now usable. Pushup counter extensions 182 and 184 and table extension 164 are in up position. Door 112 is in closed position meeting slideout panel 74, to provide bedroom privacy. Similarly door 110 can be closed to meet slideout panel 75. In FIG. 3 slightly larger trailer 150 is shown in contracted mode, and in FIG. 4 in expanded mode. The structure is nearly identical to that of FIGS. 1 and 2. The changes are that closet 52 has been replaced by a larger two doored closet 152, while stubwall 72 is part of new closet 154, and kitchen counter 80 has extension 87 beyond sink. In FIG. 5 larger trailer 160 is shown in contracted mode, and in FIG. 6 in expanded mode. The internal structure is very similar to that of FIGS. 3 and 4. Overhead cabinet 60 is omitted, while central closet 146 with forward crosswall 148, and access doors 210 and 212 in walls 92 and 94, is added, while closet 254 is modified. Bedrooms 138 and 140, kitchen 142 and dining room 144 are more spacious. In the larger trailers of FIGS. 3 to 6 pocket wall bedroom doors may replace panels 74 and 75 and doors 110 and 112. Trailer 310 of FIG. 11, while generally the same has a number of differences. Refrigerator 178 is located at the end of counter 80, while counter extension 284 is located by the side of stove 82. Bedroom 244 is adjacent kitchen 142 with overhead cabinet 168 and bed 170. Bedroom 244 has closet 254 hingeably mounting bedroom door 212. As shown bedroom 138 has bunks 172 and internal closet 66, with stubwall 72, between closets 66 and 254, Bedroom door 112 is hingeably mounted on wall 96 fitting into wall recess 108. Shelves 174 separate bedroom 138 from living area 240 which extends along the curbside trailer to kitchen 142, and contains overhead cabinet 56, sofa bed 58, table 264 and seats 262. Additional window 123 is provided for table 264. Bathroom 176 has toilet 86, shower 88 and vanity 90, and parallel walls 92 and 94, and crosswall 96, the difference is that walls 92 and 94 curve to form crosswall 93 while there is only one access door 102. The trailer of FIGS. 1 and 2 is about 15½ feet (4¾ meters) long the trailer of FIGS. 3 and 4 is about 18 feet (5½ meters) long, the trailer of FIGS. 5 and 6 is about 22 feet (6¾ meters) long as is the trailer of FIG. 11, excluding fifth wheel housing. All the trailers are about 8 feet (2½ meters) wide in contracted mode and about 14 feet (4¼ meters) wide in expanded mode, the slideouts each projecting about 3 feet (1 meter).

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A trailer having therein living accommodation, having a fixed central portion and slideout lateral room portions slidably mounted within said central portion and movable between a first retracted position and a second expanded position, said slideout room portions being substantially identical in size and opposed to each other, a bathroom having vanity, shower and toilet, in said fixed central portion extending longitudinally along said fixed central portion, having at least two side walls, at least one side wall having therein a side door permitting access to one said slideout room at least one crosswall, and said side walls extend from one end of said trailer toward the other end of said trailer, said slideout rooms when in first retracted position are telescopically nested within said central portion having their inner edge adjacent said bathroom and their outer edges adjacent the outer edges of said fixed central portion, said slideout rooms in second expanded position having their inner edges adjacent said outer edges of said fixed central portion and wherein a door and a partition extend between the outer edge of each slideout room and the sidewalls of said longitudinal bathroom providing compartments adjacent said longitudinal room and having access thereto through said side doors and said compartments in second expanded position provide sleeping accommodation.

2. Trailer of claim 1, wherein the trailer portion apart from said bathroom and said compartments, has a refrigerator in an alcove abutting said crosswall on its side opposite said bathroom, a kitchen in said fixed central portion abutting the end of the trailer away from said bathroom, a dining area mounted in the roadside slideout room outside said compartment, and an external door in the curbside slideout room outside said compartment.

3. Trailer of claim 1, wherein there are two crosswalls between said longitudinal walls, a first crosswall abutting said bathroom, a second crosswall parallel said first crosswall and farther from said bathroom, a rectangular closet formed by said crosswalls and said longitudinal walls, and paired opposed doors, in said longitudinal walls providing access from said closet to said compartments forming sleeping accommodation.

4. Trailer of claim 1, wherein said trailer is fifth wheel.

\* \* \* \* \*